E. T. SILVIUS.
FILING APPLIANCE.
APPLICATION FILED FEB. 6, 1911.
1,147,980.
Patented July 27, 1915.
5 SHEETS—SHEET 4.
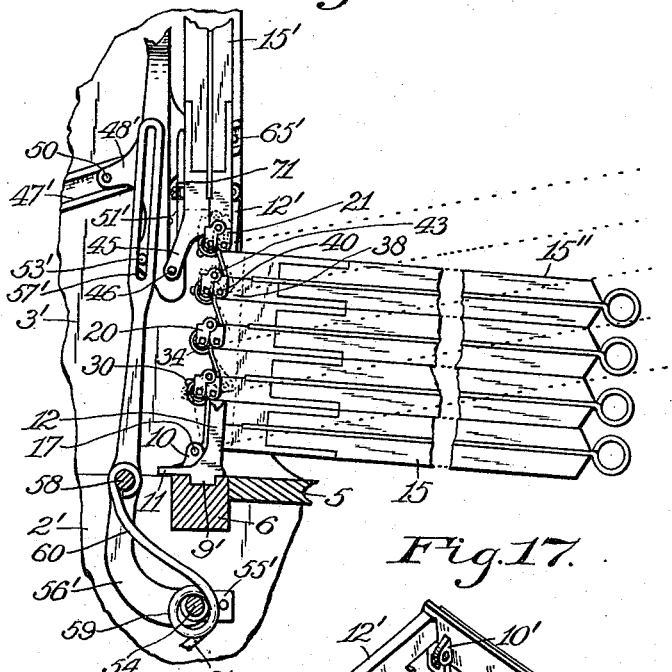
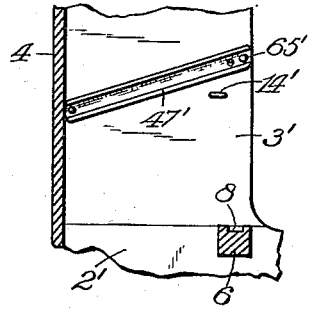
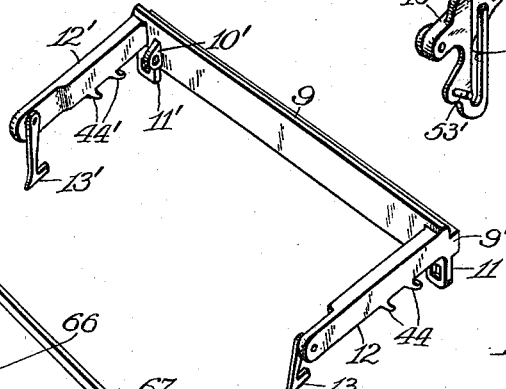
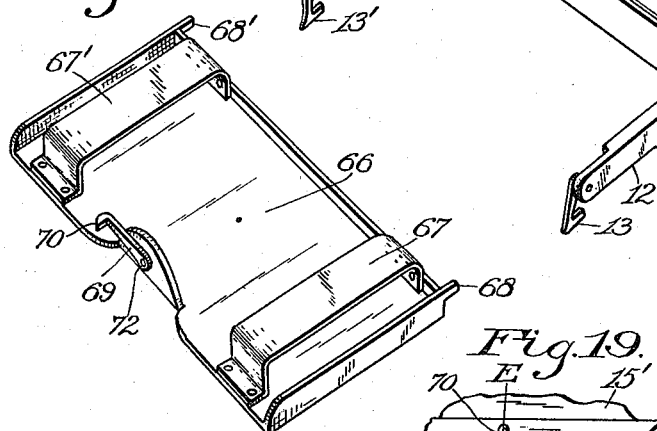
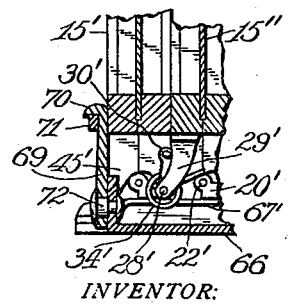
WITNESSES:
J. H. Gardner,
K. R. Woddell.
INVENTOR:
Ellis T. Silvius.

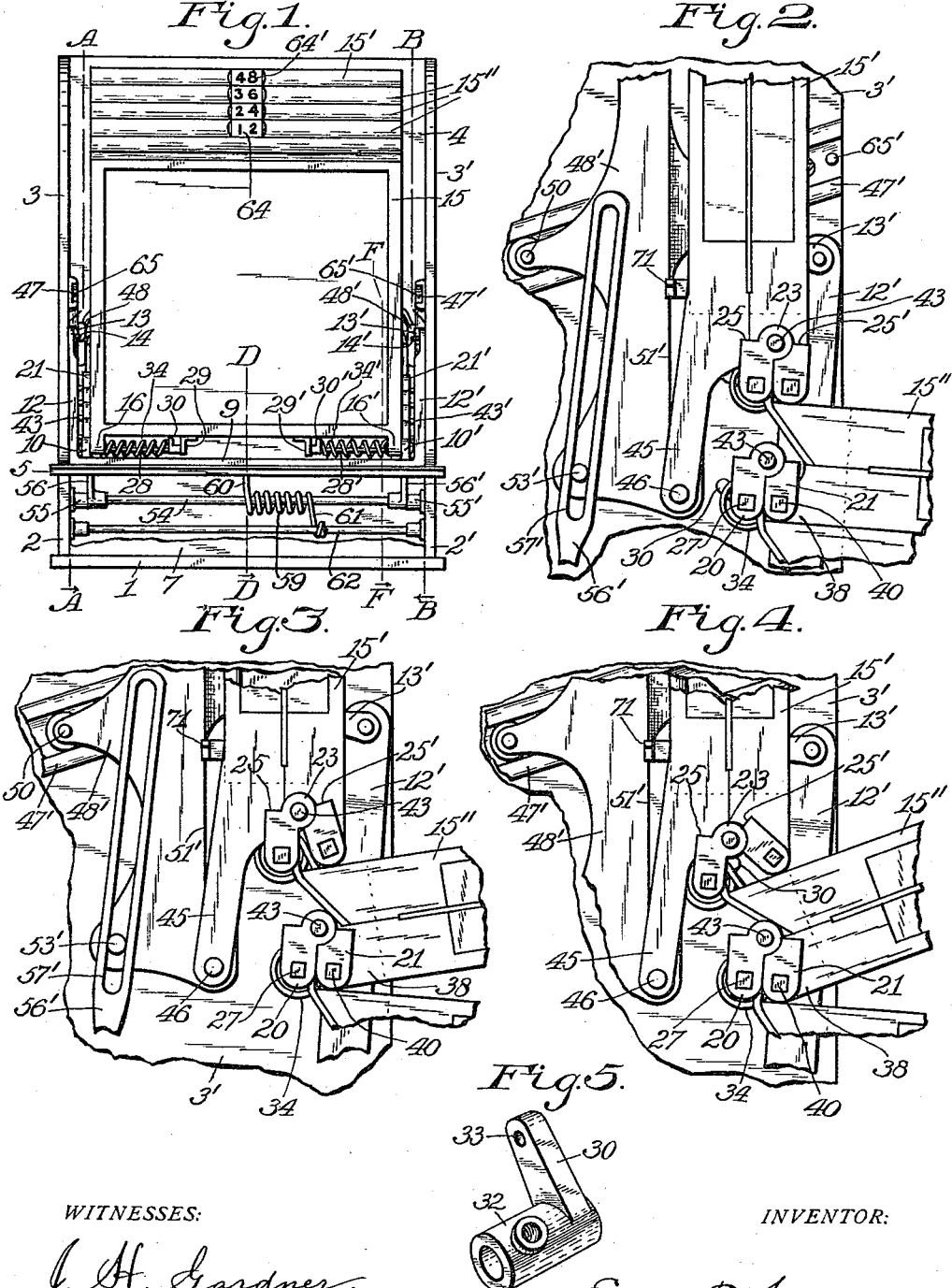
E. T. SILVIUS.
FILING APPLIANCE.
APPLICATION FILED FEB. 6, 1911.
1,147,980.
Patented July 27, 1915.
5 SHEETS—SHEET 1.
WITNESSES:
J. H. Gardner
K. R. Woddell
INVENTOR:
Ellis T. Silvius

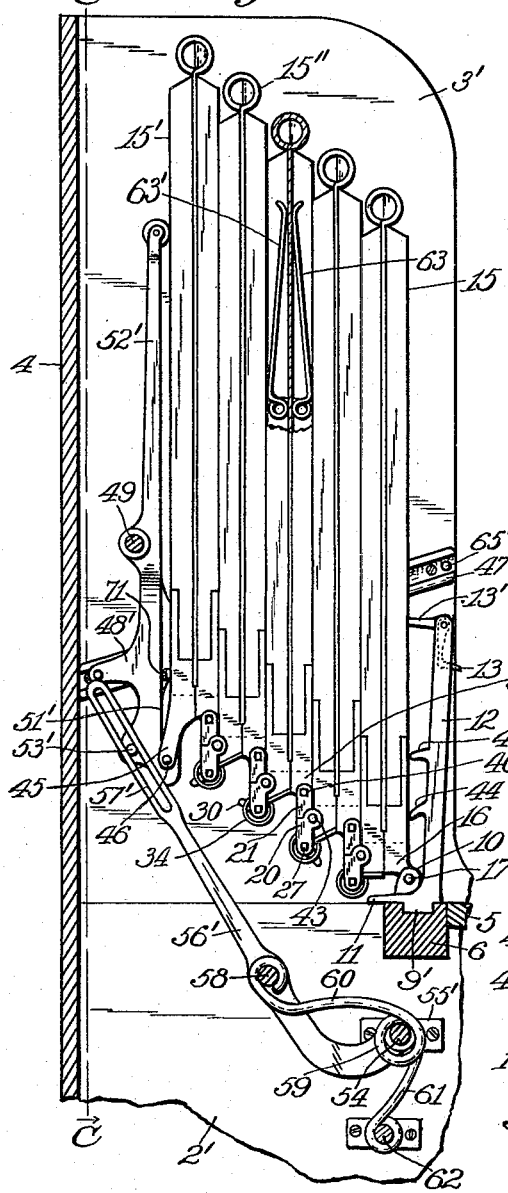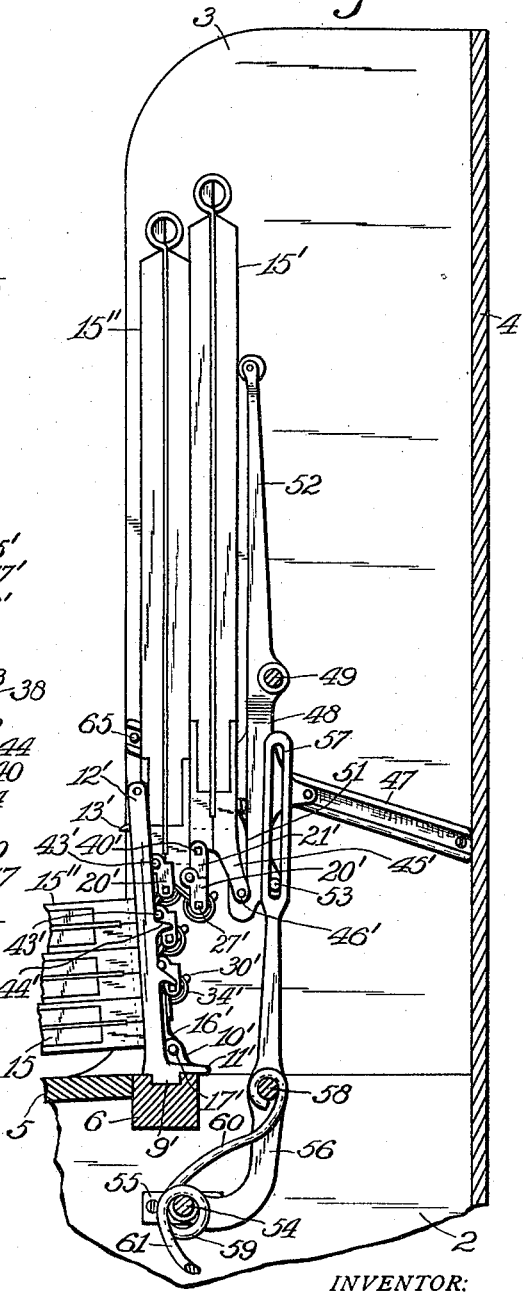

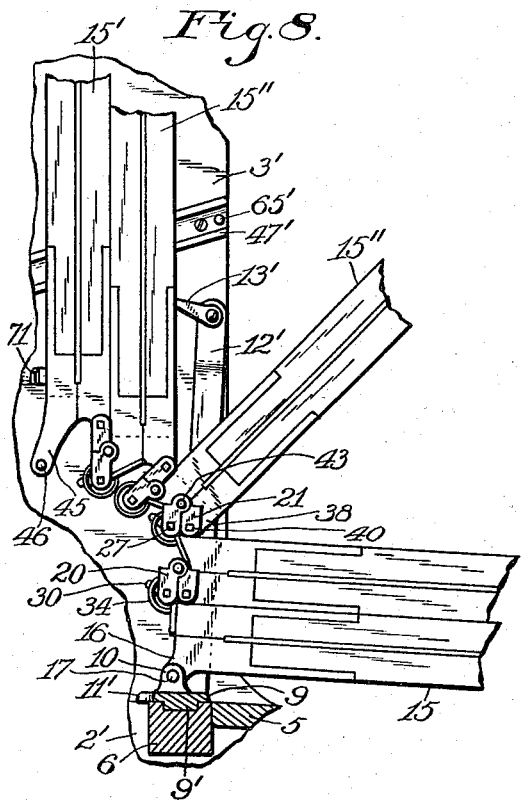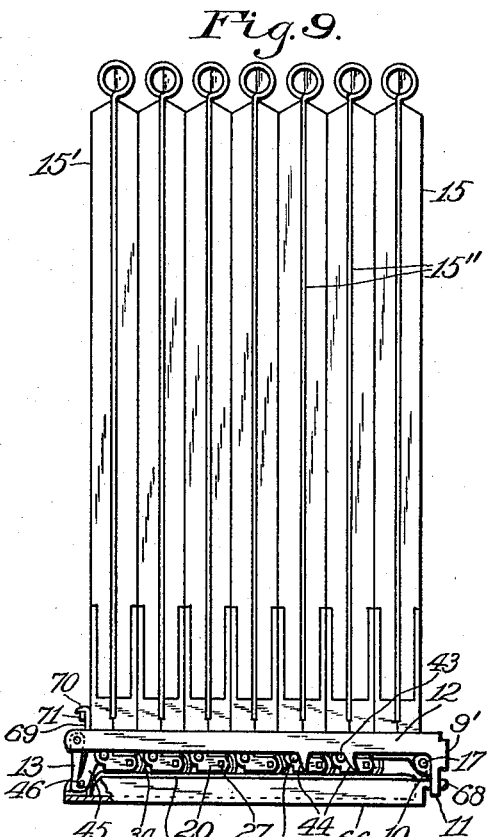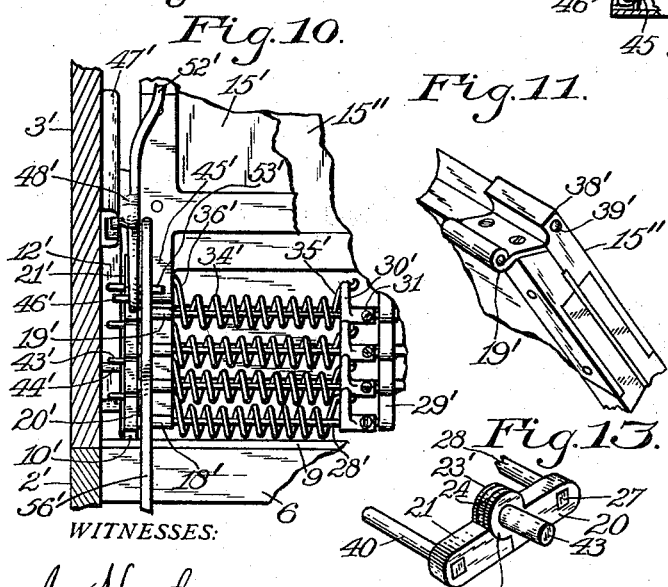

E. T. SILVIUS.
FILING APPLIANCE.
APPLICATION FILED FEB. 6, 1911.
1,147,980.
Patented July 27, 1915.
5 SHEETS—SHEET 5.
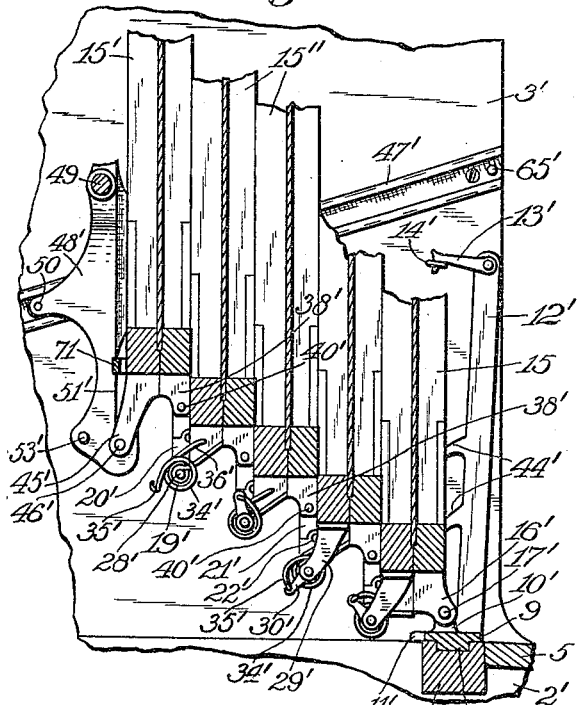
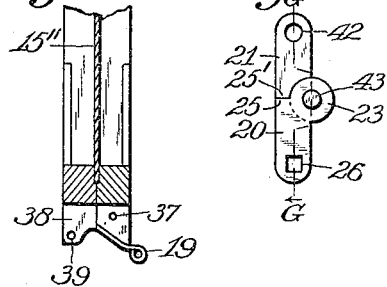
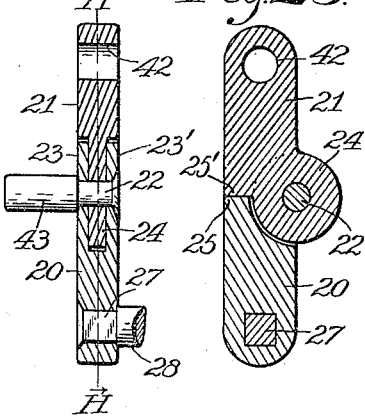
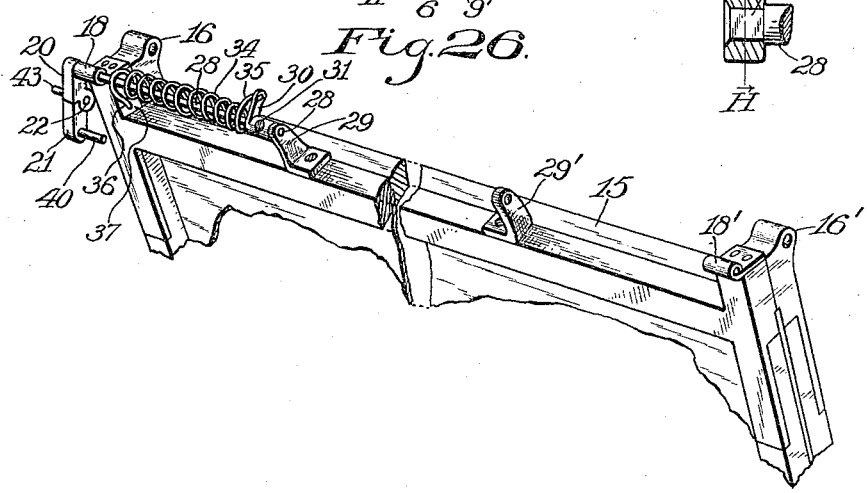
WITNESSES:
J. H. Gardner
K. R. Woddell
INVENTOR:
Ellis T. Silvius

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,147,980.  Specification of Letters Patent.  Patented July 27, 1915.

Application filed February 6, 1911. Serial No. 606,674.

*To all whom it may concern:*

Be it known that I, ELLIS T. SILVIUS, a citizen of the United States, residing at Indianapolis, in the county of Marion and State of Indiana, have invented a new and useful Filing Appliance, of which the following is a specification, reference being had to the accompanying drawings and, to the letters and figures of reference marked thereon.

This invention relates to the system of keeping credit accounts in the transaction of business by the use of duplicate bills or sale slips, the system now being generally understood, and the invention has reference particularly to a cabinet or filing appliances for holding the merchant's copies or duplicates of sales slips in systematic order.

The object of the invention is to provide improved filing appliances for preserving papers systematically for future reference, a particular object being to provide an improved credit accounting register in which the leaves for holding the bill slips shall be arranged in echelon or stepped order when in normal position, and permit the leaves to be adjusted so as to form a rectangular pack for safe storage in the minimum space when not in use.

A specific object is to provide simple and reliable means for connecting the bill holding leaves together so as to operate as above mentioned; a further object being to provide various features of construction in credit accounting registers or filing appliances of the above mentioned character.

Broadly, the invention consists in a plurality of bill-holding leaves provided with sectional folding arms or devices which connect the leaves together and maintain them in stepped relation and also permit the leaves to be adjusted to form a rectangular pack, the invention comprising also mechanism for operating and controlling the folding arms or devices.

More specifically, the invention comprises certain novel parts embodied in filing appliances, and in the combinations and arrangements of parts, as hereinafter particularly described and claimed.

Referring to the drawings, Figure 1 is a front elevation of a register or filing cabinet constructed substantially in accordance with the invention, portions of the case thereof being broken away; Figs. 2, 3 and 4, fragmentary side elevations showing different positions of bill-holding leaves during operation; Fig. 5, a perspective view of one of the parts of the mechanism; Fig. 6, a fragmentary sectional elevation approximately on the plane of the line A A in Fig. 1; Fig. 7, a fragmentary sectional elevation approximately on the plane of the line B B in Fig. 1 with the leaves in different positions; Fig. 8, a fragmentary sectional elevation approximately on the line A A showing relative positions of leaves during operation; Fig. 9, a side elevation of the leaves removed from the case and assembled in condition for storage in a safe; Fig. 10, a fragmentary sectional elevation approximately on the plane of the line C C in Fig. 6; Fig. 11, a fragmentary perspective view of one of the leaves; Fig. 12, a fragmentary section approximately on the plane of the line D D in Fig. 1; Fig. 13, a perspective view of one of the folding arms or devices for connecting the leaves together; Fig. 14, a fragmentary sectional elevation approximately on the plane of the line A A with all excepting one of the leaves in prone position; Fig. 15, a fragmentary section of the case also on the line A A; Fig. 16, a perspective view of an improved abutment for maintaining the leaves uprightly in normal position; Fig. 17, a perspective view of the base plate and guide-bars for the leaves; Fig. 18, a perspective view of a pallet on which to carry the leaves in a rectangular pack when removed from the case; Fig. 19, a fragmentary detail showing latching connections between the pallet and the rearmost leaf; Fig. 20, a fragmentary section on the plane of the line E E in Fig. 19; Fig. 21, a fragmentary sectional elevation approximately on the line F F in Fig. 1; Fig. 22, a fragmentary section of one of the leaves; Fig. 23, a side elevation of one of the folding arms of the leaves; Fig. 24, a section on the line G G in the preceding figure; Fig. 25, a section on the line H H in Fig. 24; and Fig. 26, a fragmentary perspective view of the foremost one of the leaves inverted.

In the different figures of the drawings similar reference characters indicate corresponding elements or features of construction herein referred to and clearly described.

The invention comprises a suitable case which may be variously constructed, a suitable plain type of case comprising a bottom 1, sides 2 and 2' constituting portions of a desk-like part, relatively taller sides 3 and 3' and a back 4, the desk-like part having a suitable top 5 extending forward from a transverse rail 6 which is attached to the sides at a suitable distance forward of the back of the case, the desk like part having a suitable front 7. The top of the rail 6 preferably has a recess 8 therein.

A suitable base plate 9 is provided which is adapted to be mounted removably upon the rail 6 and preferably is provided with a rib 9' adapted to fit closely into the recess 8. The base-plate extends substantially from the side 3 to the opposite side 3' and is provided with a pair of pivoting ears 10 and 10', and also a pair of guide-bars 12 and 12' on its opposite end portions, the latter extending upward against the inner faces of the sides 3 and 3' and have hooks 13 and 13' pivoted on their upper ends, the hooks being detachably connected to staples 14 and 14' which are secured to the sides of the case.

A suitable number of bill-holding leaves are provided, there being illustrated a front leaf 15, a rear leaf 15', and intermediate leaves 15''. The front leaf is provided at its normally lower forward side with hinging ears 16 and 16' which are connected to the ears 10 and 10' by means of pivots 17 and 17', respectively. The rear portion of the lower end of the front leaf 15 is provided with a pair of eyes 18 and 18', and the rear portion of the lower ends of the intermediate leaves are each provided with eyes 19 and 19', the eyes constituting hinge-members to which devices are pivotally connected for connecting the leaves together. The connecting devices preferably comprise arm members 20, 20', and companion members 21, 21', connected thereto by means of hinge pins 22, 22'. The arms are substantially alike and preferably each arm member 20 has a jaw thereon comprising two plates 23 and 23', and the member 21 has a single plate 24 extending between the plates 23 and 23' and connected thereto by the hinge-pin 22, which is located so as to be substantially in the plane of one side of the two members constituting the arm in order that the members may fold over close together, the members having shoulders 25 and 25', respectively, which come together when the arm is unfolded so as to be straight and prevent the members from further relative movement in one direction. Each arm member 20 or 20' preferably has a squared hole 26 therein in which a squared shank 27 of a pivot rod 28 or 28' is secured, the pivot rods being mounted rotatively in the eyes that are on the lower rear portions of the front and intermediate leaves, said leaves being provided with journal bearings 29 and 29' into which the pivot rods extend when it is desired to provide the folding arms with springs for assisting to operate them, in which case the pivot rods have each an arm 30 or 30' secured thereto adjustably by means of a set-screw 31 arranged adjacently to the journal boxes, each arm having a suitable hub 32 and an aperture 33. Coil springs 34 and 34' are arranged on the pivot rods 28 and 28', respectively, and have arms 35, 35', connected to the arms 30, 30', the springs having arms 36, 36', hooked into recesses 37 in the leaves. The springs are so strained as to tend to rotate the pivot rods in one direction so as to move the folding arms forwardly. The intermediate leaves and rear leaf have each a pair of hinging ears 38 and 38' on the lower forward portion thereof in each of which is a pivot hole 39 or 39' to receive pivots 40, 40', whereby the arm members 21, 21', are connected pivotally to the ears. The pivots 40, 40', may be squared and secured in squared apertures 41 (see Fig. 12) in the members 21, 21', of the arms, or said members may have journal bearings 42 in which the pivots may rotate, the pivots in such case being secured tightly in the ears of the leaves. The folding arms or knuckle-jointed devices whereby the leaves are connected together are provided each with a suitable projection or finger 43 or 43' which preferably is formed as a continuation of the hinge-pin 22 or 22', the fingers or projections preferably being cylindrical and adapted to be stopped against the guide-bars 12, 12', when the leaves are being moved to prone position, said guide-bars preferably having lateral guide fingers 44, 44', thereon extending rearwardly and downwardly for guiding the fingers 43, 43', on their approach to the guide-bars. The folding arms when straightened support the rearward adjacent leaves in relative stepped order as is desired. The lower rear portion of the rear leaf 15' is provided with a pair of downwardly extending arms 45 and 45' provided with transverse guide-pins 46 and 46', respectively.

A pair of channel guides 47 and 47' are secured to the sides 3 and 3' and extend downwardly toward the back 4. A movable abutment is provided which comprises two side members 48 and 48' which are connected together by a cross-bar 49, the side members preferably having guide-pins 50, 50', movably mounted in the channel guides, the guide-pins preferably being covered by anti-friction rollers. The abutment has two substantially vertical guide-ways 51 and 51' therein that are open at their upper ends, being preferably formed as slots with closed lower ends, the guide-ways receiving the guide-pins 46 and 46' whereby the abutment is connected detachably to the rear leaf. The abutment comprises two upwardly extending arms 52 and 52' against which the upper portion of the rear leaf is stopped in its rearward movement pivotally. The abutment is provided also with two guide-pins 53 and 53' on the rear portion thereof.

A shaft 54 is journaled in bearings 55 and 55' which are mounted on the inner side of the case, and a pair of arms 56 and 56' are mounted on the shaft and have longitudinal guideways 57 and 57' therein receiving the guide-pins 53 and 53', said arms being preferably connected together by a tie-bar 58. A coil-spring 59 is mounted on the shaft 54 and has one arm 60 connected to the tie-bar 58 and another arm 61 connected to a rod 62 mounted in the case so that the spring tends to move the arms 56 and 56' forwardly.

The leaves are suitably adapted to hold papers thereon, being preferably provided with bill clamps 63, 63', and the upper portions of the leaves have indexing characters 64, 64', thereon that are visible from the front of the cabinet. Preferably the abutment is stopped in its forward movement by means of projections 65, 65', in the forward portions of the channel guides 47, 47'.

In order to conveniently hold the leaves compactly together when removed from the case a suitable pallet 66 is provided which preferably has rails 67 and 67' thereon for directly supporting the ears of the leaves that have the arms connected thereto. The pallet has two fingers 68 and 68' adapted to be inserted in the eyes 11 and 11', the pallet being provided also with a suitable latch 69 having a projection 70 thereon adapted to engage a lug 71 secured to the back of the rear leaf 15', the latch preferably being connected to the pallet by means of a pivot 72.

In practical use the merchant or one keeping the credit accounts prepares bill slips in duplicate, one of which is delivered to the credit customer with the goods and the other placed in predetermined order on one of the leaves of the register, and the leaves normally stand upright in substantially vertical position, all being movable to prone position onto the top 5 of the desk-like part of the case. When one or more of the leaves are drawn forward pivotally the remaining upright leaves are moved forward in their normal upright position by the abutment which in turn is actuated by the arms 56 and 56', the arms being forced rearward when the leaves are returned to normal position. When one or more leaves are in prone position the operator raises them by hand some distance until the weight of the remaining upright leaves draw the forward leaves up to normal position through the force of gravity, since each leaf is supported at its forward side and the weight of the rearward leaves acts downward on its rearward side. Also, as will be seen, the forward pressure on the arms 45 and 45' exerted thereon below the pivotal support of the leaf tends to push the rear leaf to upright position, and the same force exerted by means of the spring 59 tends to push the leaves forwardly so as to stand closely together, the forward leaf resisting the forward pressure, and it and the rearward adjacent leaves are prevented from tilting forward because of the weight of the intermediate leaves tending to depress the rear sides of the leaves. When one or more of the forward leaves are drawn forward the pins 43 and 43' are brought into contact with the guide-bars 12 and 12' or their guide-fingers and stopped while the spring 59 tends to push the remaining leaves forward so that the upper members 21, 21', swing forward and downward against the lower members 20 and 20', and then the leaves swing farther down on the pivots 40 and 40'. On returning the prone leaves toward upright position the guide-pins 46 and 46' are stopped in the lower ends of the guide-ways 51 and 51' so that as seen in Fig. 4 the lower members of the folding arms are drawn downward by the upwardly swinging leaves which push the upper members of the arms upwardly or prevent them from descending, so that the arms become straightened, and they are assisted by the forward pressure of the abutment and the springs 34 and 34'. When it is desired to remove the leaves from the case the leaves are arranged in a rectangular pack with the guide-fingers 43 and 43' in contact with the guide-bars 12 and 12', the hooks 13 and 13' being released from the staples 14 and 14' and connected to the guide-pins 46, 46'. The pallet is then connected to the base plate 9 and the latch 69 connected to the rear leaf as above described, so that the leaves shall stand upright or may be carried in a rectangular pack as seen in Fig. 9.

Having thus described the invention, what is claimed as new, is—

1. A plurality of leaves normally arranged uprightly in echelon, and folding sectional supporting devices connected to adjacent sides of the leaves for bodily supporting the leaves in normal position and permitting pivotal movement of the leaves.

2. A plurality of leaves normally arranged uprightly in echelon, and means for connecting the leaves together including a pair of folding sectional arms adapted to support the leaves and permit them to be collocated into a rectangular pack as they are operated from upright to reclined position.

3. A plurality of leaves normally arranged uprightly in echelon, and a plurality of normally upright folding sectional supports connected to the lower rearward portions of the leaves and also to the lower forward portions of the adjacent rearward leaves and permitting relative pivotal movement of the leaves.

4. A plurality of normally upright leaves having pivots on the lower portions thereof beyond the rear face of the leaf, and a plurality of two-part folding supporting devices respectively connected to the pivots and also pivoted to the under side of the lower forward portion of the adjacent rearward leaves, the devices normally standing uprightly.

5. A filing appliance register including a plurality of bill-holding leaves, folding arms connecting the leaves together and provided with springs for normally holding the arms in unfolded arrangement.

6. A plurality of leaves, sectional individually foldable devices connecting the leaves pivotally together in echelon, and means for automatically folding each section of the devices with relation to the adjacent section during the pivotal movement of the leaves to arrange the leaves in a rectangular pack in prone position.

7. A plurality of upright leaves, a plurality of knuckle-jointed arms pivotally mounted on one of the leaves and standing uprightly, the arms pivotally supporting an adjacent leaf and provided with springs for yieldingly holding the leaves together.

8. In a filing appliance, a case, a series of leaves, means permitting the leaves to swing from vertical to horizontal position in the case and vice versa, and means extending behind the leaf pack and serving to help elevate the remaining leaves as one or more of the forward leaves are lowered to horizontal position.

9. In a filing appliance, a case, a series of leaves, means permitting the leaves to swing from upright to horizontal positions in the case and vice versa, and a unitary means engaging the leaf pack serving to help elevate the remaining leaves as one or more of the forward leaves are lowered to horizontal position and also carrying the upper ends of said remaining leaves forward.

10. A filing appliance including a plurality of normally upright forwardly-facing bill holding leaves, knuckle-jointed arms pivotally connected to adjacent sides of adjacent leaves, a movable abutment connected with the rearmost one of the leaves, and motive means connected with the abutment for normally forcing the abutment yieldingly forward.

11. A filing appliance including a case, a plurality of bill-holding leaves, sectional folding arms standing uprightly on the leaves and on their upper ends supporting the adjacent leaves, and movable means coöperating with the case and the rearmost leaf to maintain the latter in normal position and to move the pivotal support thereof forward when the forward leaves are moved pivotally from normal position.

12. A plurality of leaves having each a plurality of sectional individually folding arms pivotally connected thereto and supporting the leaves uprightly in echelon, each two arms being supported uprightly by one leaf and supporting the next adjacent leaf, the foremost one of the leaves being pivotally supported, and means with which the arms coöperate during movement of the leaves for folding the sectional arms to collocate the leaves in a rectangular pack.

13. A plurality of leaves having each a plurality of folding arms pivotally connected thereto and supporting the leaves uprightly in echelon, the foremost one of the leaves being pivotally supported, each arm having a finger thereon, and a pair of upright guide bars to be engaged by the fingers when the leaves are moved toward prone position, the guide bars having laterally extending guides thereon to also be engaged by the fingers.

14. A case, a base plate mounted in the case, two upright guide-bars on the base plate having rearwardly extending guide fingers thereon, a plurality of leaves the foremost one of which is pivotally mounted on the base plate, and a plurality of adjustable connecting devices between the leaves provided with projections adapted to engage the guide bars and the guide fingers when the leaves are moved forward toward prone position, for readjusting the devices to collocate the leaves in a rectangular pack.

15. A plurality of leaves arranged face to face in upright position, a pivotal support for the foremost one of the leaves, adjustable means having relatively movable portions connecting the leaves together and normally standing vertically and supporting them in echelon, the foremost leaves supporting the rearward adjacent leaves, an arm fixed on the rearmost one of the leaves extending below the plane of the supporting means thereof, guide-bars to be engaged by the adjustable supporting means, means for limiting the pivotal movement of the rearmost one of the leaves rearwardly, and motive means exerted on the arm to move the leaves forwardly and the rearward leaves upward pivotally.

16. A plurality of leaves having each a plurality of pairs of folding arms pivotally connected thereto and supporting the leaves uprightly in echelon, the foremost one of the leaves being pivotally supported, each pair of arms being supported uprightly by one leaf and supporting the next adjacent leaf, each arm having a laterally extending finger thereon, a pair of stationary devices to be engaged by the fingers when the leaves are moved toward prone position for folding the arms to collocate the leaves in a rectangular pack, and means coöperating with the leaves and the arms, when the leaves are moved from prone position, for unfolding the arms to collocate the leaves in echelon when in upright position.

17. In a cabinet, the combination with a case, of a plurality of leaves grouped uprightly together and arranged in the case, the foremost one of the leaves being pivotally supported for normally supporting the remaining leaves in upright position, sectional adjustable means connecting the leaves together and normally supporting them in echelon, and means mounted in the case to be engaged by the adjustable means for adjusting the latter.

18. In a cabinet, the combination with a case, and a plurality of leaves, of sectional foldable means connecting the leaves hingedly together and normally supporting them uprightly in echelon, means for pivotally supporting the foremost one of the leaves in the case, and means comprising a stationary device and a movable device mounted in the case for folding or unfolding the sectional foldable means during movement of the leaves on their supports.

19. In a cabinet, the combination with a case, and a plurality of leaves, of sectional foldable means connecting the leaves hingedly together and in unfolded condition normally supporting them uprightly in echelon, means for pivotally supporting the foremost one of the leaves in the case, and means mounted in the case acting, during movement of the leaves on their supports, to fold or unfold the sectional foldable means.

20. In a filing device, the combination with a plurality of leaves, of a plurality of arms having each a pivot-rod rigid on one end thereof that is mounted rotatively in one of the leaves and has a spring connected thereto, the spring being connected also to the leaf, the opposite end of each arm being pivotally connected to an adjacent one of the leaves.

21. In a filing device, the combination with a plurality of leaves, of a plurality of foldable devices for connecting the leaves together, each one of the devices comprising a plurality of members, one of the members being pivotally connected to one of the leaves and another of the members pivotally connected to an adjacent leaf, and a hinge pin connecting the said two members together and projecting beyond one side of the members for folding or unfolding the devices.

22. In a filing device, the combination with a plurality of normally upright leaves, the foremost one being pivotally supported, and a pair of guide bars fixedly supported, of a plurality of pairs of sectional supporting devices for the remaining leaves, each device comprising a plurality of parts connected together for relative movement and adapted to engage one of the guide bars for effecting the movement, one part of each device being pivotally connected to one and the remaining part to and supporting an adjacent one of the leaves.

23. In a filing device, the combination of a plurality of leaves uprightly arranged face to face, and a plurality of pairs of supporting devices connecting the leaves together, each device comprising a plurality of parts connected together for relative movement each to the other, one part of a device being pivotally supported on the rearward portion of a leaf and normally extending upward, the remaining part also extending upward and being pivotally connected to and supporting the forward portion of an adjacent leaf, with means for moving and controlling the movement of the parts of the supporting devices.

24. In a filing device, the combination of a plurality of leaves having each a plurality of sectional folding supporting devices pivotally connected thereto and supporting the leaves uprightly in echelon, each device comprising a plurality of relatively movable parts connected respectively with two adjacent leaves and provided with a laterally projecting controlling finger, with supported means to be engaged by the fingers for moving the parts of the devices relatively each to the other.

25. In a filing device, the combination with a case, and a plurality of guides uprightly supported by the case, of a plurality of leaves the foremost one of which is pivotally mounted in the case, and a plurality of adjustable connecting devices between the leaves provided with controlling projections adapted to engage the guides when the leaves are moved forwardly, for readjusting the devices to collocate the leaves in a rectangular pack.

26. In a filing device, the combination with a case, and a base fixedly secured in the case and having a pair of upright guide bars thereon, a plurality of leaves of which one is pivotally supported on the base, and sectional adjustable pivotal connections between the leaves permitting relatively longitudinal movement of the leaves and adapted for engagement with the guide bars for readjustment of the connections to effect the relative longitudinal movement.

In testimony whereof, I affix my signature in presence of two witnesses.

ELLIS T. SILVIUS.

Witnesses:
P. A. HAVELICK,
J. H. GARDNER.

Copies of this patent may be obtained for five cents each, by addressing the "Commissioner of Patents, Washington, D. C."